(12) United States Patent
Sundaram et al.

(10) Patent No.: US 10,814,288 B2
(45) Date of Patent: Oct. 27, 2020

(54) SEPARATION OF GASES USING REACTIVE ADSORBENTS AND MEMBRANES

(71) Applicant: ExxonMobil Research and Engineering Company, Annandale, NJ (US)

(72) Inventors: Narasimhan Sundaram, Annandale, NJ (US); David C. Calabro, Bridgewater, NJ (US); Hans Thomann, Bedminster, NJ (US); Randall D. Partridge, Califon, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 543 days.

(21) Appl. No.: 15/653,853

(22) Filed: Jul. 19, 2017

(65) Prior Publication Data
US 2018/0036688 A1    Feb. 8, 2018

Related U.S. Application Data

(60) Provisional application No. 62/370,898, filed on Aug. 4, 2016.

(51) Int. Cl.
*B01D 53/22*     (2006.01)
*B01D 69/14*     (2006.01)
(Continued)

(52) U.S. Cl.
CPC ....... *B01D 69/147* (2013.01); *B01D 53/0407* (2013.01); *B01D 53/229* (2013.01);
(Continued)

(58) Field of Classification Search
CPC ............ B01D 71/022; B01D 2251/406; B01D 2256/16; B01D 2251/408;
(Continued)

(56) References Cited

U.S. PATENT DOCUMENTS

| 4,167,457 A | * | 9/1979 | Giner | ................... | B01D 53/326 |
| | | | | | 204/432 |
| 6,004,374 A | | 12/1999 | Rao et al. | | |

(Continued)

FOREIGN PATENT DOCUMENTS

| DE | 3918430 A1 | 12/1990 |
| EP | 0661502 A2 | 7/1995 |

OTHER PUBLICATIONS

Ruthven et al., "Performance of a parallel passage adsorbent contactor", Separation and Purification Technology, vol. 12 (1997) pp. 43-60.

(Continued)

*Primary Examiner* — Anthony R Shumate
(74) *Attorney, Agent, or Firm* — Priya G. Prasad (57) ABSTRACT

Gas separation modules and methods for use including an integrated adsorbent and membrane. In certain refining applications, it is paramount to obtain high purity product gases. Adsorbent beds are effective at removing certain contaminants, such as $CO_2$, from gas streams containing product and contaminant constituents to form a product-rich stream. The integrated membrane permits a further separation of products from any unadsorbed contaminant to produce a high purity product, such as hydrogen, stream. The gas separation modules described herein include stacked, radial, and spiral arrangements. Each modules includes a configuration of feed and cross-flow channels for the collection of contaminant gases and/or high purity product gases.

9 Claims, 6 Drawing Sheets

(51) Int. Cl.
*B01D 53/04* (2006.01)
*B01D 71/02* (2006.01)
*B01D 71/06* (2006.01)

(52) U.S. Cl.
CPC ........... *B01D 71/022* (2013.01); *B01D 71/06* (2013.01); *B01D 2251/30* (2013.01); *B01D 2251/302* (2013.01); *B01D 2251/304* (2013.01); *B01D 2251/306* (2013.01); *B01D 2251/40* (2013.01); *B01D 2251/402* (2013.01); *B01D 2251/404* (2013.01); *B01D 2251/406* (2013.01); *B01D 2251/408* (2013.01); *B01D 2251/606* (2013.01); *B01D 2253/102* (2013.01); *B01D 2253/106* (2013.01); *B01D 2253/108* (2013.01); *B01D 2253/204* (2013.01); *B01D 2256/16* (2013.01); *B01D 2256/245* (2013.01); *B01D 2257/102* (2013.01); *B01D 2257/302* (2013.01); *B01D 2257/304* (2013.01); *B01D 2257/504* (2013.01); *B01D 2258/0283* (2013.01); *B01D 2311/2626* (2013.01); *B01D 2325/08* (2013.01); *B01D 2325/12* (2013.01); *Y02C 10/08* (2013.01); *Y02C 10/10* (2013.01)

(58) Field of Classification Search
CPC ...... B01D 2311/2626; B01D 2251/402; B01D 2251/304; B01D 2251/404; B01D 2325/08; B01D 2251/606; B01D 53/229; B01D 2256/245; B01D 2253/204; B01D 69/147; B01D 2257/504; B01D 2257/302; B01D 2251/40; B01D 2251/306; B01D 53/0407; B01D 2251/30; B01D 2253/102; B01D 2257/102; B01D 2251/302; B01D 2253/108; B01D 2258/0283; B01D 2253/106; B01D 2257/304; B01D 71/06; B01D 2325/12

See application file for complete search history.

(56) References Cited

U.S. PATENT DOCUMENTS

| | | | |
|---|---|---|---|
| 6,228,145 B1* | 5/2001 | Falk-Pedersen ... | B01D 53/1475 95/44 |
| 6,478,855 B1 | 11/2002 | Okano | |
| 6,607,584 B2 | 8/2003 | Moreau et al. | |
| 7,049,259 B1 | 5/2006 | Deckman et al. | |
| 9,255,744 B2 | 2/2016 | Huizing | |
| 10,556,803 B2* | 2/2020 | Wilcox ................ | B01D 53/228 |
| 2003/0183080 A1* | 10/2003 | Mundschau ......... | B01D 71/022 95/55 |
| 2005/0079374 A1* | 4/2005 | Asai ..................... | B01J 21/08 428/613 |
| 2005/0241477 A1* | 11/2005 | Mundschau ......... | B01D 53/228 95/56 |
| 2013/0192461 A1* | 8/2013 | Miller ................ | B01D 67/0039 95/47 |
| 2014/0271450 A1* | 9/2014 | Ishikawa ................ | C22C 27/02 423/658.2 |
| 2017/0296983 A1* | 10/2017 | Noda ................... | B01D 71/027 |
| 2018/0079653 A1* | 3/2018 | Wilcox ................ | B01D 67/0072 |
| 2018/0147533 A1* | 5/2018 | Seo ...................... | B01D 35/02 |
| 2019/0039024 A1* | 2/2019 | Roy ........................ | C02F 1/281 |
| 2019/0301992 A1* | 10/2019 | O'Brien ............... | B01D 63/087 |

OTHER PUBLICATIONS

The International Search Report and Written Opinion of PCT/US2017/042767 dated Jan. 10, 2018.

* cited by examiner

SEPARATION OF GASES USING REACTIVE ADSORBENTS AND MEMBRANES

CROSS-REFERENCE TO RELATED APPLICATIONS

This application claims the benefit of U.S. Provisional Application No. 62/370,898, filed on Aug. 4, 2016, the entire contents of which are incorporated herein by reference.

FIELD

This invention relates to gas purification adsorbents and membranes in combination and related processes for purifying gas streams.

BACKGROUND

Gas streams frequently require purification to remove undesirable contaminants; for example, contaminants that are frequently to be removed from gas streams include acidic compounds such as hydrogen sulfide, sulfur dioxide, and carbon dioxide. These components are frequently found in natural gas and have to be brought down to low levels before the gas can be sent through transmission pipelines; hydrogen sulfide often requires separation from gas streams produced in petroleum refining operations such as hydrotreating. Adsorptive gas separation techniques are common in various industries using solid sorbent materials such as activated charcoal or a porous solid oxide such as alumina, silica-alumina, silica, or a crystalline zeolite such as zeolite A.

One type of gas separation technology is swing adsorption. For example, the pressure-swing adsorption (PSA) process adsorbs impurities from a gaseous stream into an adsorbent material in one step and releases the impurities in a subsequent step of a cycle. As another example, the temperature-swing adsorption (TSA) process, which may include PSA process steps, utilizes heating and cooling to enhance the effectiveness of this gas purification.

Conventional adsorption processes are not 100% efficient. For example, in a gas stream consisting of at least one contaminant gas and one product gas, it is likely portion of the contaminant gas will be present in the effluent stream, which is desired to include only the product gas. Thus, there exists a need to further purify a product gas after it has undergone an adsorption process. Alternative separation technologies may be used for further separation of a product gas from the other constituents of the feed gas. Membrane separation systems are used in combination with adsorption systems to provide suitable product gas separation and are generally known in the art.

SUMMARY

Gas separation modules with integrated adsorbents and membranes and methods of gas separation are provided. In one aspect, the gas separation module comprises a first sheet with an inlet zone and an outlet zone, the inlet zone being coated with an adsorbent, the outlet zone being coated with a membrane. In another aspect the gas separation module comprises a second sheet configured substantially the same as the first. The first sheet and second sheet may be stacked upon one another vertically with a space sheet separating them. In one aspect, the spacer sheet can be configured to allow flow of a feed gas from the inlet zone to the outlet zone. In another aspect, the spacer sheet can be configured to allow flow into the inlet zone, but can be blocked at the outlet zone. This latter arrangement can facilitate a greater pressure differential across the membrane coated outlet zone, which is beneficial for membrane separation.

In another aspect, the gas separation module can comprise a third sheet configured substantially similar to the first and second sheets. The third sheet can be stacked upon the first sheet, spacer sheet, and second sheet arrangement. The third sheet may be stacked upon the second sheet and separated from the second sheet by a transverse spacer sheet. In one aspect, the transverse spacer sheet is configured to block flow from the inlet zone to the outlet zone thereby forming a channel that is substantially orthogonal to feed flow. A product gas that is permeates the membrane portion of the second sheet is then available for collection via cross flow in the channel formed by the transverse spacer sheet. Alternatively, the transverse spacer sheet may be configured such that the inlet zone is blocked and the outlet zone is open. This configuration would be used in conjunction with the spacer sheet that is blocked at the outlet zone and open at the inlet zone described above. In this alternative arrangement, the product gas is available for collection in the same direction as feed flow and adsorbed contaminant is available for desorption/collection in cross flow.

In certain aspects, only the side of the sheet that contacts the feed flow is coated with the adsorbent and membrane. It is preferred, that the ratio of surface area coated by the membrane to the surface area coated by the adsorbent is 0.5 or less, e.g. 0.3 or less. In one aspect, the adsorbent comprises one of an (i) alkali metal carbonate and an oxide of an alkaline earth metal or a transition metal and (ii) alkaline earth metal carbonate and an oxide of a transition metal. The module can contain more than one adsorbent in an intermediate zone between the inlet zone and the outlet zone if it is desired to adsorb more than one gaseous species. In another aspect, the membrane comprises a metallic membrane such as a membrane comprising one of palladium or vanadium. In another aspect, the membrane comprises one of an inorganic membrane, a polymer membrane, a carbon membrane, and a composite membrane.

In yet another aspect, the gas separation module can contain a plurality of adsorbent/membrane coated sheets arranged radially, wherein alternating between each of the sheets is a spacer sheet forming a channel to allow a feed flow from the inlet zone of each sheet to the outlet zone of each sheet and a transverse spacer sheet configured to block the feed flow from the inlet zone of each sheet to the outlet zone of each sheet and forming a channel to allow a cross flow substantially orthogonal to the direction of feed flow. That is the arrangement would be a radial pattern of adsorbent/membrane coated sheet, spacer sheet, adsorbent/membrane coated sheet, transverse spacer sheet, adsorbent/membrane coated sheet, spacer sheet, adsorbent/membrane coated sheet, transverse spacer sheet, and so on until the arrangement creates an annulus.

In another aspect, the gas separation module comprises a first and second sheet separated by a spacer sheet, wherein the first, second, and spacer sheets are wound about a to central axis to form a spiral wound gas separation module. The spacer sheet is closed at the inlet zone and open at the outlet zone and forms a permeate channel. A retentate channel is formed by virtue of the winding. The retentate channel permits a feed flow from the inlet zone to the outlet zone of the first and second sheets. Permeate from the feed flow passes through the membrane portion of the first and second sheets into the permeate channel. The permeate channel terminates in a spiral header such that permeate is permitted to flow from within the permeate channel to the spiral header. The retentate channel terminates in a separate header from the spiral header such that a retentate is permitted to flow from the termination of the retentate channel to Also disclosed herein is a method for gas separation using any of the above described gas separation modules. The method includes providing a feed gas comprising a product and a contaminant; providing a gas separation module as described above, admitting the feed gas to the feed gas channel; adsorbing a portion of the contaminant onto the adsorbent in the inlet zone thereby creating a product-rich stream comprising the product and unadsorbed contaminant; contacting the product-rich stream with the membrane in the outlet zone; permeating the product across the membrane such that the product enters the cross flow or permeate channels; desorbing the adsorbed contaminant from the adsorbent in the inlet zone; collecting a non-product effluent stream comprising the contaminant via the feed gas channel; and collecting a product effluent stream comprising the product via the cross flow channels. It would be understood by a person of skill in the art that the methods steps may vary slightly based on the gas separation module embodiment employed. For example, the product gas may be available for collection in the direction of feed gas or orthogonal to the direction of feed gas. Likewise with the non-product gas may be available for collection in the direction of feed gas or orthogonal to the direction of feed gas.

The feed gas may include any type of refinery gas stream such as flue gas or syngas. In one aspect of the method the product includes hydrogen. In another aspect, the contaminant includes carbon dioxide, or carbon dioxide and nitrogen.

Additionally, the gas separation module disclosed herein need not be comprised of sheets exclusively. In some embodiments, the gas separation module comprises a first surface and a second surface separated from one another by a channel, wherein the surfaces and channels are created by machining three-dimensional substrates or three-dimensional solids or by 3D printing.

DETAILED DESCRIPTION OF THE EMBODIMENTS

General Considerations

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

The processes and modules described herein will generally refer to separations involving synthesis gas as the feed gas, but it will be understood that other feed gases can be used. Synthesis gas or "syngas" is a byproduct a variety of refinery process. Syngas is a mixture comprising carbon monoxide, carbon dioxide, and hydrogen. It is produced by gasification (or burning/combustion) of a carbon containing fuel to a gaseous product. Production of syngas is ubiquitous to refinery processing via the inevitable use of furnaces, boilers, reformers and the like found in hydrocarbon processing. Even in emerging technologies, such as fuel cells, syngas is produced as a byproduct along with electricity, water, and heat.

The Water Gas Shift (WGS) reaction is important in carbon capture and sequestration (CCS) and the proper handling of syngas. WGS describes the reaction of carbon monoxide and water vapor to form carbon dioxide and hydrogen.

As can be see, the WGS reaction provides a source of hydrogen at the expense of carbon monoxide. Hydrogen is a valuable product and can be used in hydroprocessing applications, which generally refers to conversion of heavy petroleum fractions into lighter ones via hydrocracking. It can also be used to produce ammonia.

Hydrogen is most abundantly produced by steam methane reformers (SMR) in petrochemical facilities. Steam reforming describes the reaction of methane with steam to produce hydrogen and carbon monoxide.

Here, methane is exposed to steam at very high temperatures to form carbon monoxide and hydrogen. In a second stage, additional hydrogen is produced by exposing the carbon monoxide product to the WGS reaction described above.

Sorption Enhanced Water Gas Shift (SEWGS) describes processes where the WGS reaction is combined with $CO_2$ capture. Syngas enters the SEWGS unit where carbon monoxide is treated with steam to produce carbon dioxide and hydrogen. The carbon dioxide is then adsorbed onto an adsorbent producing a nearly pure hydrogen product. Carbon dioxide can then be desorbed and then deposited via the sites CCS facilities.

In application, there is a likelihood that not all carbon monoxide will shift via WGS to carbon dioxide and hydrogen. Likewise, not all carbon dioxide will be adsorbed onto the adsorbent. This will leave trace amounts of carbon monoxide and carbon dioxide in the product stream, which is undesirable.

In other potential applications, flue gas from a combustion reaction can be separated into its various constituents. Flue gas will generally comprise carbon dioxide and water vapor as well as nitrogen and excess oxygen remaining from the intake combustion air. It may also contain a small percentage of air pollutants such as particulate matter, carbon monoxide, nitrogen oxides, sulfur oxides and mercury. A portion of the flue gas can be effectively separated to generate a high purity carbon dioxide stream, while reducing and/or minimizing the energy required for the separation, and without needing to reduce the temperature of the flue gas. This can allow another (e.g., the remaining) portion of the recycled exhaust gas, which can typically be composed of a majority of nitrogen, to be used to generate additional electricity, e.g., without having to adjust the pressure and/or temperature of the recycled exhaust gas to accommodate the conditions required for the carbon dioxide separation process. In a reducing atmosphere—i.e. an atmospheric condition in which oxidation is prevented by removal of oxygen and other oxidizing gases or vapors, and which may contain actively reducing gases such as hydrogen, carbon monoxide and gases that would oxidize in the presence of oxygen, such as hydrogen sulfide-both $H_2$ and CO are produced as a result of combustion. The CO, $CO_2$, and $H_2$ may be used to create a hydrogen product as described above with respect to syngas. There is an additional need, in the flue gas context, to further separate the nitrogen from hydrogen, which may be done via a membrane separation as described below.

Adsorbent Membrane Configurations and Processes

Figure 1A:
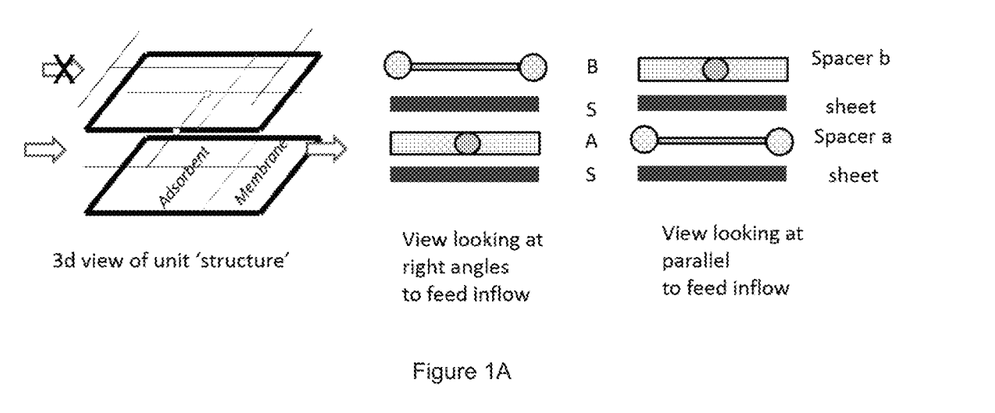
FIG. 1A shows a simplified illustration of a layered adsorbent and membrane combination.
Figure 1B:
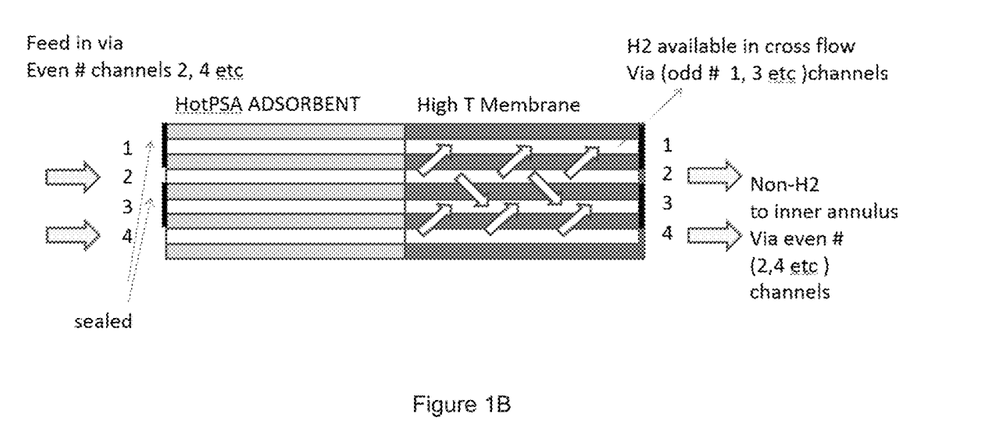
FIG. 1B shows a simplified illustration of a feed flow through an adsorbent and membrane combination from a top view.

In various aspects, adsorbent/membrane configurations are disclosed. FIGS. 1A and 1B depicted a layered adsorption and membrane gas separation module configuration. In one aspect the gas separation module comprises a first sheet coated with an adsorbent on that portion of the sheet first exposed to a feed gas—i.e. the inlet zone—and coated with a membrane on that portion of the sheet proximate to the outlet of the module—i.e. the outlet zone. The ratio of the area of the sheet coated with the membrane to the area of the sheet coated with the adsorbent is 0.5 or less, e.g., 0.3 or less. The gas separation module may be stacked and contain a second sheet configured substantially similar to the first sheet. The second sheet is separated from the first sheet by a spacer sheet. As shown in FIG. 1A, the spacer sheet is configured so as to form a channel for a feed gas to flow between the first sheet and the second sheet from the inlet zone to the outlet zone. Additionally, the stack may include another spacer sheet, referred to as a transverse spacer sheet, which, as shown in FIG. 1A, can be superposed upon the adsorbent/membrane sheet. The transverse spacer sheet is configured to block flow from the inlet zone to the outlet zone of the first and second sheet, but to allow a cross flow substantially orthogonal to the direction of feed flow. In one aspect, this stack—first sheet, spacer sheet, second sheet, transverse spacer sheet—can be repeated multiple times in formation of the gas separation module.

In operation, the adsorption/membrane process can be described with reference to FIG. 1B, which is a top view of FIG. 1A. As shown, a feed gas enters the gas separation module from the left. In this case, the feed gas is a syngas comprising CO, $CO_2$, and $H_2$. The desired product is $H_2$ and the contaminants are CO and $CO_2$. In alternative embodiments, the feed gas may be a flue gas where the desired product would still be $H_2$, but $N_2$ would be an additional contaminant. Transverse spacer sheet(s) block(s) the flow of feed gas from entering or exiting channels 1 and 3. The feed gas enters channels 2 and 4 where it contacts adsorbent coated onto sheets on either side of the channel. The adsorbent is selected based on its selectivity for the desired contaminant over the desired product. The contaminant is adsorbed onto the adsorbent and a feedstream that is rich in the desired product continues down the channel to the membrane coated portion of the sheet. The adsorbed contaminant can later be desorbed via pressure or temperature change and purged via steam or some other suitable purge gas, such as nitrogen. Additionally, a countercurrent purge over the membrane retentate region can be initiated concurrently with the purge of the adsorbent region to ensure that no desorbed contaminant ingresses to the membrane retentate region during desorption. The membrane is selected such that the desired product is the permeate and unadsorbed contaminant is the retentate.

As a specific example and with reference to FIG. 1B, syngas enters channels 2 and 4. CO is shifted to $CO_2$ via the water gas shift reaction and/or SEWGS, which may occur prior to or concurrent with entry to the gas separation module. $CO_2$ is adsorbed onto the adsorbent coated onto the inlet zone of the sheet producing an $H_2$-rich stream including unadsorbed contaminant, such as $CO_2$ and CO. The $H_2$-rich stream progresses down channels 2 and 4. When the $H_2$-rich stream contacts the membrane coated outlet zone of the sheet, $H_2$ permeates the membrane and collects in sealed channels 1 and 3. The non-$H_2$ retentate exits channels 2 and 4. The high-purity $H_2$ product can then be collected via cross flow substantially orthogonal to the direction of feed flow.

Figure 2A:
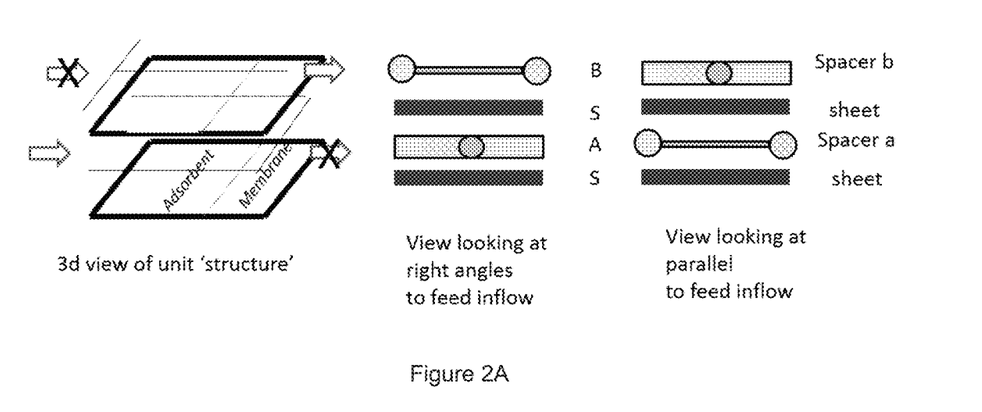
FIG. 2A shows a simplified illustration of an alternative layered adsorbent and membrane combination.
Figure 2B:
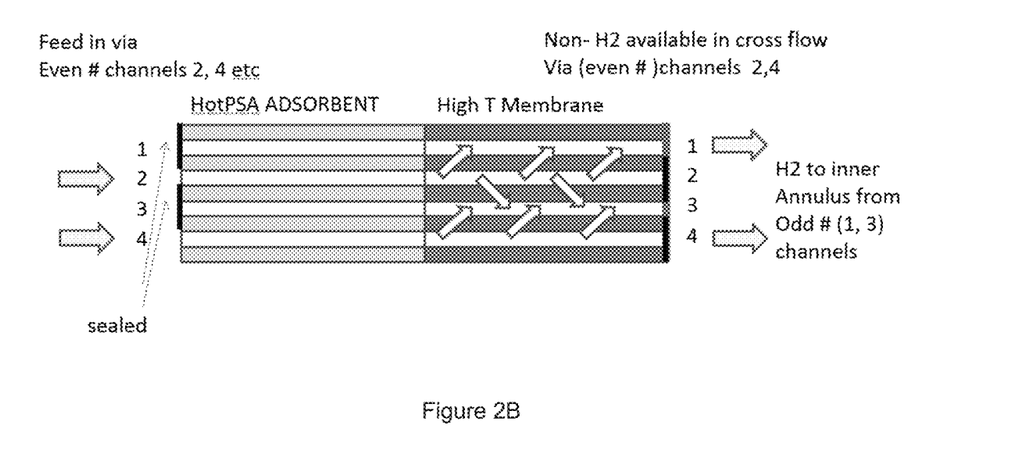
FIG. 2B shows a simplified illustration of a feed flow through an alternative adsorbent and membrane combination from a top view.

An alternative embodiment is show in FIGS. 2A and 2B. The principles of operation are generally the same, but the spacer sheet and transverse spacer sheet are configured differently. As shown in FIG. 2A the spacer sheet is configured such that the inlet is open and the outlet is blocked, and the transverse spacer sheet is configured such that the inlet is blocked and the outlet is open. This configuration may be preferred in some applications as it will maximize feed gas contact with the adsorbent and membrane sheet. With reference to FIG. 2B, syngas enters channels 2 and 4. CO is shifted to $CO_2$ via the water gas shift reaction and/or SEWGS, which may occur prior to or concurrent with entry to the gas separation module. $CO_2$ is adsorbed onto the adsorbent coated onto the inlet zone of the sheet while a $H_2$-rich stream including unadsorbed contaminant, such as $CO_2$ and CO, progresses down the channel. When the $H_2$-rich stream contacts the membrane coated outlet zone of the sheet, $H_2$ permeates the membrane and collects in channels 1 and 3. Because the outlet of channels 1 and 3 are open, $H_2$ proceeds is collected at the outlet of channels 1 and 3, which may be an inner annulus of a radially arranged bed. The non-$H_2$ retentate remains channels 2 and 4 because the outlet in those channels are blocked. The non-$H_2$ can then be collected via cross flow substantially orthogonal to the direction of feed flow.

Figure 3A:
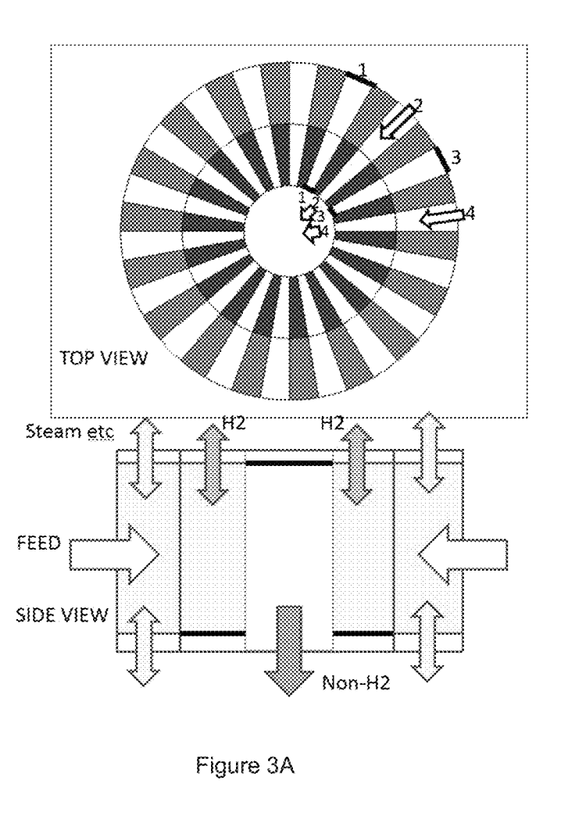
FIG. 3A depicts a radially arranged adsorbent and membrane combination from a top view and a side view.

FIG. 3A depicts a top and side view of the adsorbent/membrane combination arranged in a radial configuration. As shown, a feed gas enters the gas separation module from the sides via channels 2 and 4, which are formed by the spacer sheets. A contaminant is adsorbed onto the adsorbent coated inlet zone. The adsorbed contaminant can later be desorbed via pressure or temperature change and purged via steam or some other suitable purge gas, such as nitrogen. A product-rich stream including unadsorbed contaminant, progresses down the channel. When the product-rich stream contacts the membrane coated outlet zone of the sheet, the desired product permeates the membrane and collects in channels 1 and 3, which are sealed in the direction of feed flow due to the transverse spacer sheet configuration. The product permeate is collected via cross-flow from channels 1 and 3 exits the gas separation module through an upper header. Additionally, a countercurrent purge over the membrane retentate region can be initiated concurrently with the purge of the adsorbent region to ensure that no desorbed contaminant ingresses to the membrane retentate region during desorption. The unadsorbed contaminant is permitted to enter the inner annulus through channels 2 and 4 and exits the gas separation module through a lower header.

Figure 3B:
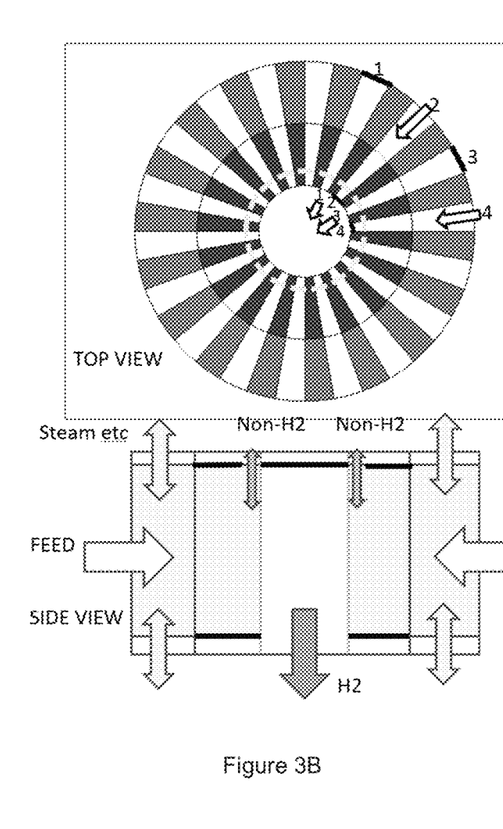
FIG. 3B depicts a radially arranged adsorbent and membrane combination from a top view and a side view.

In an alternative embodiment, FIG. 3B depicts an adsorbent and membrane arrangement in which the inlet zone of channels 2 and 4 are open while the outlet zone of channels 2 and 4 are closed. Conversely, the outlet zone of channels 1 and 3 are open while the inlet zone of channels 1 and 3 are closed. In this configuration a contaminant is adsorbed onto the adsorbent coated inlet zone. The adsorbed contaminant can later be desorbed via pressure or temperature change and purged via steam or some other suitable purge gas, such as nitrogen. A product-rich stream including unadsorbed contaminant, progresses down the channel. When the product-rich stream contacts the membrane coated outlet zone of the sheet, the desired product permeates the membrane and collects in channels 1 and 3 and is able to exit the channel to the inner annulus and exits the gas separation module through a lower header. The contaminant retentate is collected via cross-flow from channels 2 and 4 exits the gas separation module through an upper header. The upper header may contain narrow openings for the contaminant retentate to promote greater exposure and contact between the feed gas to the membrane.

Figure 4:
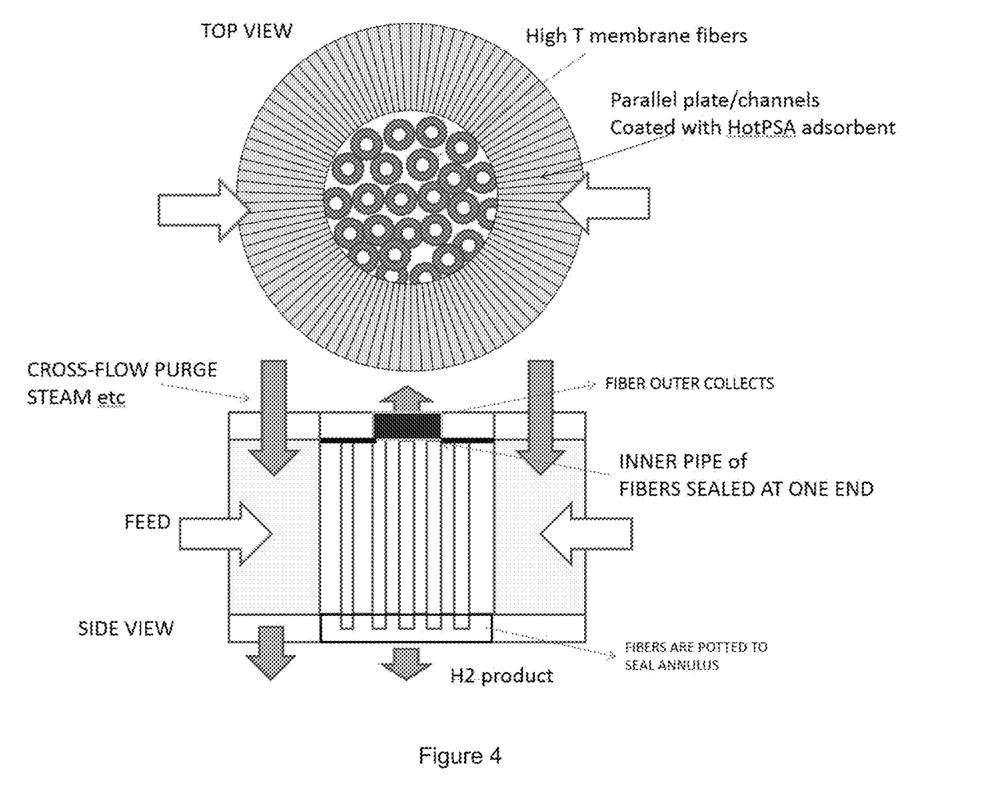
FIG. 4 depicts a radially arranged adsorbent and membrane combination from a top view and a side view.

FIG. 4 depicts yet another embodiment wherein a plurality of adsorbent sheets are arranged radially to form an annular gas separation module. In this embodiment, only a reactive adsorbent is coated on the sheets rather than a reactive adsorbent and a membrane. Spacer sheets are included between the adsorbent sheets to form a channel from the outer surface to the inner surface. A plurality of annular membranes are disposed within the inner void space of the adsorbent annulus. The inner void space of the adsorbent annulus is sealed on one end and open at the other end. Likewise, each of the annular membranes are sealed at one end an open at the other end. The sealed ends of the annular membranes are opposite the sealed end of the adsorbent annulus and vice versa.

As shown in FIG. 4, a feed gas comprising at least one contaminant and at least one product enters the gas separation module from the sides and travels toward the inner void space of the adsorbent annulus via channels created by the spacer sheets. The at least one contaminant is adsorbed the sheets coated with a reactive adsorbent. The adsorbed contaminant can later be desorbed via pressure or temperature change and purged via steam or some other suitable purge gas, such as nitrogen. A product-rich stream including unadsorbed contaminant, progresses down the channel and eventually exits the channel into the inner void space of the absorbent annulus. There, the product-rich stream contacts the plurality of annular membranes. The annular membrane material is selected such that the desired product is permitted to permeate the membrane and collect in the annular membrane inner void space, while the retentate contaminant remains in the inner void space of the adsorbent annulus. The inner void space of the adsorbent annulus is sealed on one end and open to a retentate header on the other. Contaminant retentate exits the gas separation module via the retentate header. The plurality of annular membranes are also sealed at one end an open at the other end. The open ends of the annular membranes are in fluid communication with a permeate header. Product permeate exits the gas separation module via the permeate header.

Figure 5:
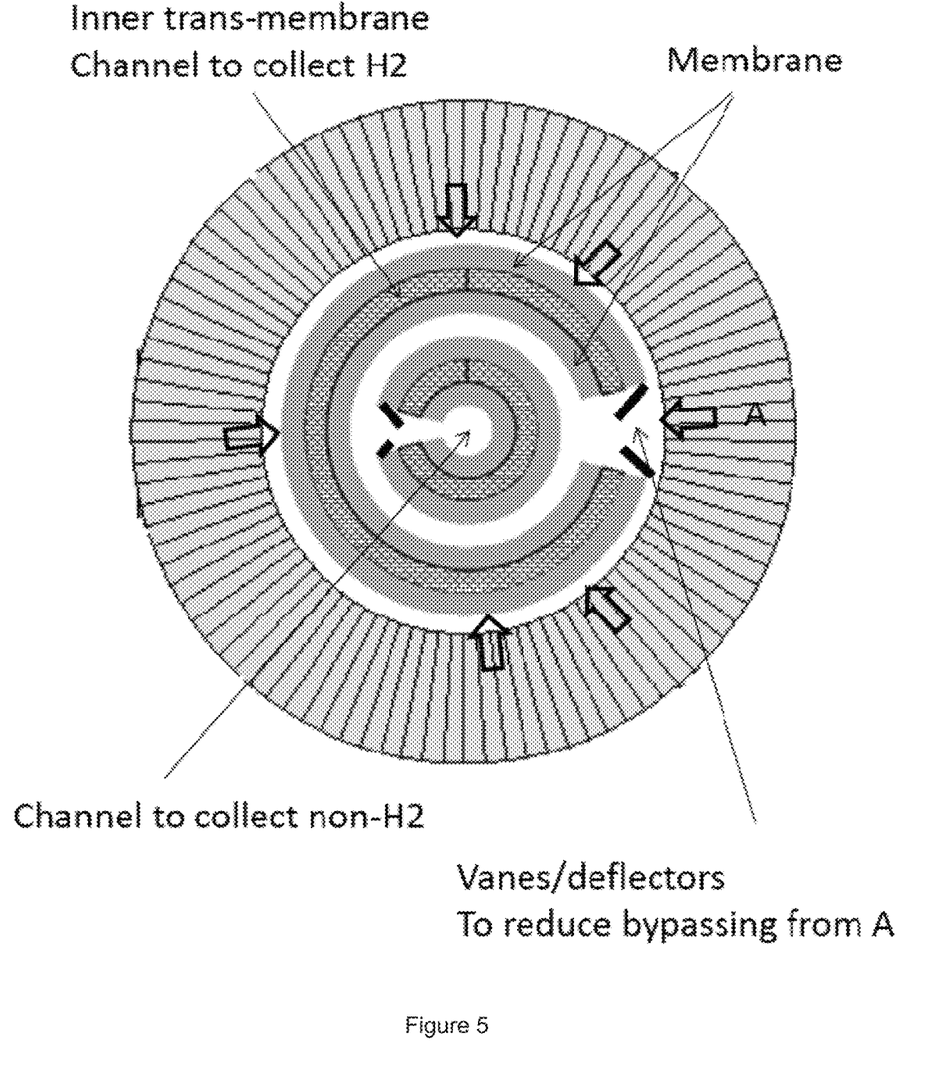
FIG. 5 depicts a radially arranged adsorbent and membrane combination with incorporated vanes/deflectors from a top view

FIG. 5 depicts an arrangement similar to FIG. 4, but further incorporates vanes and/or other deflectors to promote contact of the product-rich stream with the membranes disposed within the inner void space of the adsorbent annulus.

Figure 6:
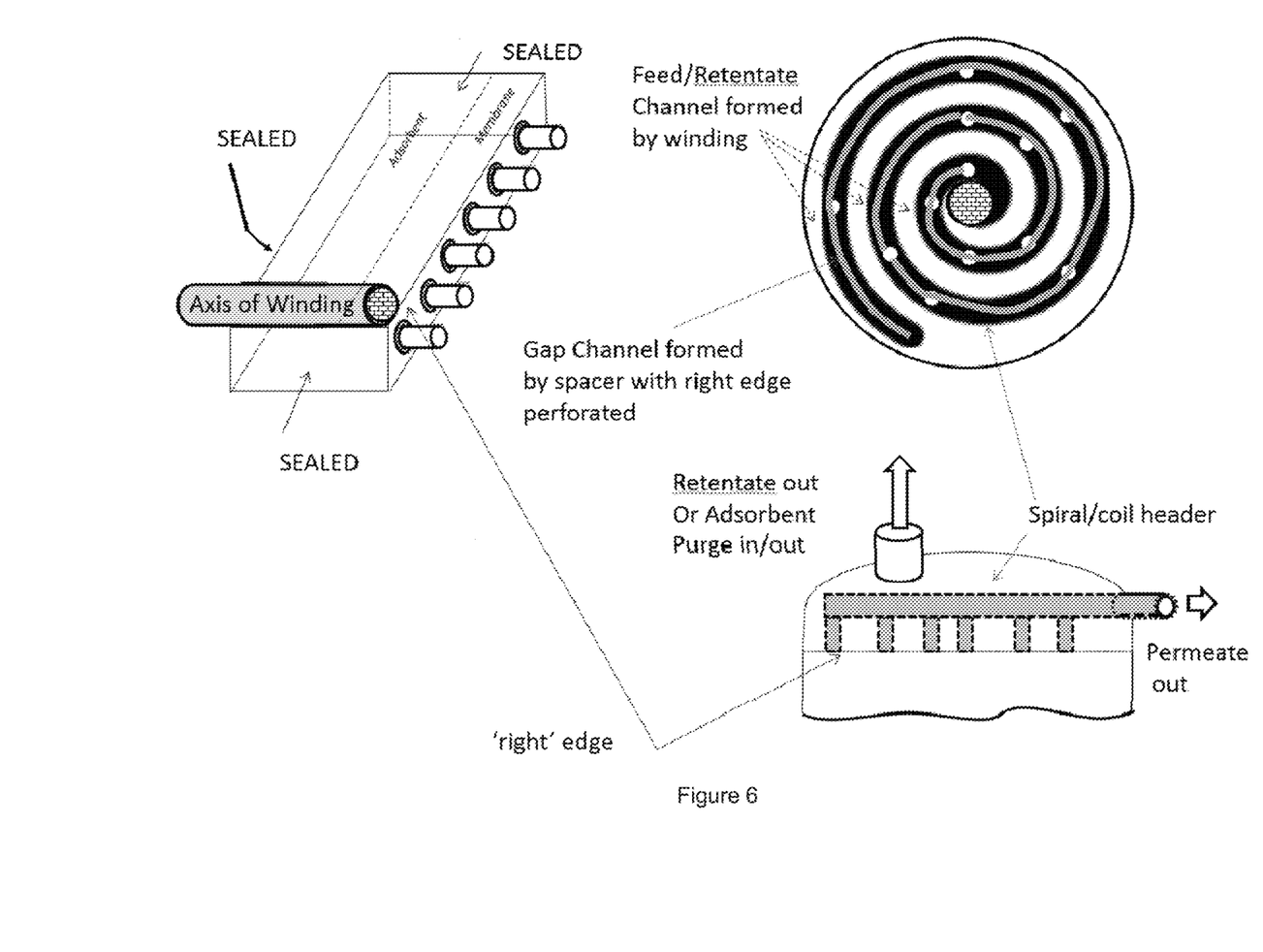
FIG. 6 depicts a spirally wound adsorbent and membrane combination.

FIG. 6 depicts yet another embodiment. As shown, the first sheet, which is coated with an adsorbent in an inlet zone and a membrane in an outlet zone is wound about a central axis to form a spiral wound gas separation module. A channel is formed between adjacent planes of the first sheet by virtue of the winding. The channel permits a feed flow from the inlet zone to the outlet zone of the first sheet. The outlet zone of the first sheet terminates in a spiral header such that a product permeate is permitted to flow from within the outlet zone to the spiral header. The channel terminates in a separate header from the spiral header such that a contaminant retentate is permitted to flow from the termination of the channel to an outlet of the gas separation module.

Adsorbent

The adsorbent can be used in the form of a thin, adherent coating (for example a wash coating) of the adsorbent material on a solid support core which may be formed of a non-porous material or a porous material of the desired low permeability. Dimensions of the gas passages, and hence the pressure drop through the adsorption bed, can be set by the characteristic dimension of the particles, the density of particle packing, and the polydispersity of the particle sizes.

It is preferred to have an adsorbent layer of relatively uniform thickness on the adsorbent material (particles). The preferred thickness of the adsorbent layer can be set by the mass transfer coefficients, as well as the time of the key steps in the swing adsorption process (e.g., adsorption and desorption steps). Calculation of these mass transfer rate constants is well known to those having ordinary skill in the art and may additionally or alternately be derived by those having ordinary skill in the art from standard testing data. D. M. Ruthven & C. Thaeron, "Performance of a Parallel Passage Adsorbent Contactor," *Separation and Purification Technology,* 12 (1997), 43-60, which is incorporated herein by reference, discloses many aspects of how the mass transfer can be affected by the thickness of the adsorbent, channel gap, and cycle time of the process. Also, U.S. Pat. No. 6,607,584, which is also incorporated by reference herein, describes the details for calculating these transfer rates and associated coefficients for a given adsorbent and the test standard compositions used for conventional PSA.

Thickness can advantageously be taken to refer to the average thickness of the adsorbent. The thickness uniformity can be assessed from measurements of the thickness of the adsorbent and/or from the way in which it is fabricated. It can be preferred in many embodiments that the thickness uniformity of the adsorbent be such that the standard deviation of its thickness is less than about 40% of the average thickness, e.g., less than about 15% or less than about 5%.

The adsorbent material coated onto the core particles can be selected according to the service needs, particularly the composition of the incoming gas stream, the contaminants which are to be removed and the desired service conditions, e.g., incoming gas pressure and temperature, desired product composition and pressure. Non-limiting examples of selective adsorbent materials can include, but are not limited to, microporous materials such as zeolites, metal organic frameworks, AlPOs, SAPOs, ZIFs, (Zeolitic Imidazolate Framework based molecular sieves, such as ZIF-7, ZIF-8, ZIF-22, etc.), and carbons, as well as mesoporous materials such as amine-functionalized MCM materials, and combinations and intergrowths thereof. For the acidic gases, such as hydrogen sulfide and carbon dioxide, typically found in natural gas streams, adsorbent such as cationic zeolites, amine-functionalized mesoporous materials, stannosilicates, carbons, and combinations/intergrowths thereof can be suitable.

The adsorbent coating can be in the form of individual particles (such as zeolite crystals) bound together to form a coating, a mixed matrix film containing the adsorbent particles, a porous layer having a sorbent (absorbent or adsorbent) in the pore structure, or a reasonably contiguous film of adsorbent material, as well as a combination of these structures. Non-limiting examples of mixed matrix films can include, but are not limited to, polymer films such as silicone rubber, polyimide films containing particles of zeolites such as DDR, CHA, MFI, Beta, FAU, and/or combinations or intergrowths thereof, and the like. Mixed matrix films on the exterior of the core can additionally or alternately contain pore/void structures. Examples of void structures can include voids between the polymer adsorbent particles, while pore structures can typically comprise interconnected pore networks. Examples of reasonably contiguous films of adsorbent materials can include crystalline adsorbent materials that are intergrown to form a film of adsorbent crystals, films of amorphous adsorbent materials, and the like. Intergrown films of adsorbent crystals can include zeolite films of DDR, MFI, and/or CHA grown on the exterior surface of the core. These films can additionally or alternately contain voids/pore networks. Examples of a porous layer having an adsorbent in the pore structure can include porous alumina with an ionic liquid imbibed into the pore structure. Examples of a porous layer having an adsorbent in the pore structure can include porous alumina with small zeolite particles packed/bound into the pore structure.

One example of a suitable adsorbent includes a mixed metal oxide adsorbent, such as an adsorbent including a mixture of an alkali metal carbonate and an alkaline earth metal oxide and/or a transition metal oxide. Examples of suitable alkali metal carbonates can include, but are not limited to, a carbonate of lithium, sodium, potassium, rubidium, cesium, or a combination thereof, e.g., a carbonate of lithium, sodium, potassium, or a combination thereof. Examples of suitable alkaline earth metal oxides can include, but are not limited to, oxides of magnesium, calcium, strontium, barium, or a combination thereof, e.g., oxides of magnesium and/or calcium. Some examples of suitable transition metal oxides can include, but are not limited to, oxides of lanthanide series metals, such as lanthanum, and/or of transition metals that can form oxides with the metal in a +2 or +3 oxidation state (such as yttrium, iron, zinc, nickel, vanadium, zirconium, cobalt, or a combination thereof).

In some aspects, the carbonate can be selected independently from the oxide in the mixed metal oxide. In such aspects, the carbonate can include, consist essentially of, or be lithium carbonate, sodium carbonate, potassium carbonate, rubidium carbonate, and/or cesium carbonate (e.g., lithium carbonate, sodium carbonate, and/or potassium carbonate; lithium carbonate and/or potassium carbonate; lithium carbonate and/or sodium carbonate; or sodium carbonate and/or potassium carbonate).

In aspects where the carbonate is selected independently from the oxide, the oxide can be an alkaline earth oxide, a transition metal oxide, a combination of two or more alkaline earth oxides, a combination of two or more transition metal oxides, or a combination of oxides including at least one alkaline earth oxide and at least one transition metal oxide. In aspects where the independently selected oxide includes one or more alkaline earth oxides, a suitable alkaline earth oxide can include, consist essentially of, or be magnesium oxide, calcium oxide, strontium oxide, and/or barium oxide, e.g., including at least magnesium oxide and/or calcium oxide. Additionally or alternatively, it may be advantageous to incorporate graphene complexes into the metal oxides to assist in adsorption.

In aspects where the independently selected oxide includes one or more transition metal oxides, suitable transition metals can include, consist essentially of, or be one or more transition metals that can form oxides with the metal in a +2 or +3 oxidation state (e.g., yttrium oxide, iron oxide, zinc oxide, nickel oxide, vanadium oxide, cobalt oxide, zirconium oxide, lanthanum oxide, other oxides of lanthanide metals, and/or a combination thereof). One preferred option includes a transition metal oxide selected from lanthanum oxide and/or zirconium oxide. Another option includes a metal oxide selected from lanthanum oxide, yttrium oxide, zirconium oxide, and/or zinc oxide. Yet another option includes a metal oxide selected from nickel oxide, cobalt oxide, and/or iron oxide. Mixtures within each of these options and/or across options are also contemplated, such as mixtures of lanthanum oxide with zinc oxide and/or vanadium oxide; mixtures of lanthanum oxide with iron oxide, cobalt oxide, and/or nickel oxide; mixtures of zirconium oxide with yttrium oxide, zinc oxide, and/or vanadium oxide; and mixtures of zirconium oxide with iron oxide, cobalt oxide, and/or nickel oxide.

In aspects where the independently selected oxide includes one or more alkali metal oxides and one or more transition metal oxides, suitable alkali metal oxides can include, consist essentially of, or be magnesium oxide, calcium oxide, strontium oxide, and/or barium oxide, while suitable transition metals can include, consist essentially of, or be transition metals that can form oxides with the metal in a +2 or +3 oxidation state, such as yttrium oxide, iron oxide, zinc oxide, nickel oxide, vanadium oxide, cobalt oxide, zirconium oxide, lanthanum oxide, and/or other lanthanide oxides. Each of these alkali metal oxides and transition metal oxides can be independently selected individually or in any combination of multiple transition metal oxides. Examples of mixtures can include, consist essentially of, or be a mixture of oxides where at least one oxide is lanthanum oxide, zirconium oxide, and/or magnesium oxide; a mixture of oxides where the mixture includes at least two of lanthanum oxide, zirconium oxide, and magnesium oxide; a mixture of oxides where one oxide is magnesium oxide and/or calcium oxide; and/or a mixture of oxides where at least one oxide is lanthanum oxide, yttrium oxide, and/or zirconium oxide.

In some alternative aspects, a mixed metal oxide can include an alkaline earth carbonate in combination with a transition metal oxide. In such aspects, the alkaline earth carbonate can include, consist essentially of, or be magnesium carbonate and/or calcium carbonate. Additionally or alternatively, the alkaline earth carbonate can be present in a mixture with an alkali metal carbonate. Examples of such carbonate mixtures can include, consist essentially of, or be mixtures of lithium carbonate with magnesium carbonate, lithium carbonate with calcium carbonate, potassium carbonate with magnesium carbonate, potassium carbonate with calcium carbonate, sodium carbonate with magnesium carbonate, and sodium carbonate with calcium carbonate (e.g., lithium carbonate with magnesium carbonate or potassium carbonate with magnesium carbonate). In such aspects, suitable transition metals can include, consist essentially of, or be transition metals that can form oxides with the metal in a +2 or +3 oxidation state, such as yttrium oxide, iron oxide, zinc oxide, nickel oxide, vanadium oxide, cobalt oxide, zirconium oxide, lanthanum oxide, other lanthanide oxides, and/or a combination thereof. Each of these alkaline earth carbonates and transition metal oxides can be independently selected individually or in any combination of multiple alkaline earth carbonates and/or multiple transition metal oxides. For the transition metal oxide, one preferred option can include a transition metal oxide selected from lanthanum oxide or zirconium oxide. Another option can include a metal oxide selected from lanthanum oxide, yttrium oxide, zirconium oxide, and/or zinc oxide. Yet another option can include a metal oxide selected from nickel oxide, cobalt oxide, and/or iron oxide. Mixtures within each of these options and/or across options are also contemplated, such as mixtures of oxides where at least one oxide is lanthanum oxide and/or zirconium oxide; mixtures of lanthanum oxide with zinc oxide and/or vanadium oxide; mixtures of lanthanum oxide with iron oxide, cobalt oxide, and/or nickel oxide; mixtures of zirconium oxide with yttrium oxide, zinc oxide, and/or vanadium oxide; and/or mixtures of zirconium oxide with iron oxide, cobalt oxide, and/or nickel oxide.

Additional or alternative materials can include hydrotalcites.

Examples of suitable coating methods can include fluid phase coating techniques, such as slurry coating, slip coating, hydrothermal film formation, hydrothermal coating conversion, and hydrothermal growth. When non-hydrothermal coating techniques are used, the coating solutions can typically include the adsorbent and a viscosifying agent, such as polyvinyl alcohol, and optionally a heat transfer solid and a binder. The heat transfer solid may not be needed in situations where the core of the particle can act as its own heat sink, e.g., by storing and releasing heat in the different steps of the separation process cycle. If a viscosifying agent, such as polyvinyl alcohol, is used, it can usually burn away when the coating is cured, e.g., in a kiln. Binders such as colloidal silica and/or alumina may be used to increase the mechanical strength of the fired coating. If the adsorbent includes a microporous, mesoporous, and/or macroporous component, this can typically occupy from about 20 to about 60% (e.g., from about 20% to about 40%) of the volume of the cured coating. To reduce the void volume of coatings containing such components, a blocking agent can be applied in a separate coating process. When hydrothermal film formation methods are chosen to apply the adsorbent layer, the coating techniques used can be very similar to the way in which zeolite membranes are prepared. An example of a method for growing a zeolite layer is described in U.S. Pat. No. 7,049,259, to which specific reference is made herein for incorporation of a description of such a method. Zeolite layers grown by hydrothermal synthesis on supports can often have cracks and grain boundaries that are mesoporous and/or macroporous in size. The volume of these pores can often be less than about 10 vol % of the film thickness, and there can often be a characteristic distance, or gap, between cracks. Thus, as-grown films can often be used directly as an adsorbent layer without the need for a blocking agent.

When the adsorbent coating is in the form of individual bound particles, the particles of the adsorbent material may be coated onto the core particles from a liquid e.g., a suspension or solution, and/or can be adhered to the particles, e.g., by physical attraction. One method for preparing a coating of individual bound particles can be to wash coat the particles onto the core. The wash coat can include binder particles that do not act as adsorbents.

When the adsorbent coating is a mixed matrix film containing adsorbent particles, it can be deposited on the cores from a slurry containing a solvent, polymer, and zeolite(s) can be coated onto the surface of the core in a variety of fluid bed, and spray drying and extrusion processes. In these processes the solvent can advantageously evaporate, leaving the mixed matrix polymer and zeolite film.

When the adsorbent is an intergrown film of adsorbent crystals, the coating can be produced by hydrothermal and/or solvothermal synthesis. For example, films of intergrown DDR (as well as MFI) crystals can readily be produced by hydrothermal synthesis. When the adsorbent is a film of an amorphous adsorbent material, it may be solution coated onto the core and/or formed on the core by a chemical reaction.

Membrane

Membranes suitable for use in the disclosed gas separation module include a metallic membrane such as palladium or vanadium. Alternative membrane embodiments are known to those skilled in the art, and generally comprise inorganic membranes, polymer membranes, carbon membranes, metallic membranes, composite membranes having more than one selective layer, and multi-layer systems employing non-selective supports with selective layer(s). Inorganic membranes may be comprised of zeolites, preferably small pore zeolites, microporous zeolite-analogs such as AlPO's and SAPO's, clays, exfoliated clays, silicas and doped silicas. Inorganic membranes are typically employed at higher temperatures (e.g., >150° C.) to minimize water adsorption. Polymeric membranes typically achieve hydrogen selective molecular sieving via control of polymer free volume, and thus are more typically effective at lower temperatures (e.g., <200° C.). Polymeric membranes may be comprised, for example, of rubbers, epoxies, polysulfones, polyimides, and other materials, and may include crosslinks and matrix fillers of non-permeable (e.g., dense clay) and permeable (e.g., zeolites) varieties to modify polymer properties. Carbon membranes are generally microporous and substantially graphitic layers of carbon prepared by pyrolysis of polymer membranes or hydrocarbon layers. Carbon membranes may include carbonaceous or inorganic fillers, and are generally applicable at both low and high temperature. Metallic membranes are most commonly comprised of palladium, but other metals, such as tantalum, vanadium, zirconium, and niobium are known to have high and selective hydrogen permeance. Metallic membranes typically have a temperature- and $H_2$-pressure-dependent phase transformation that limits operation to either high or low temperature, but alloying (e.g., with Copper) is employed to control the extent and temperature of the transition. Most typically, metallic membranes are used between about 200° C. and about 500° C. Preferred metallic membranes are composed of a Pd/Cu alloy film supported on a porous asymmetric substrate. Preferred Pd/Cu films are less than 5 microns thick; more preferred films are less than 2 microns thick.

The adsorbent and membrane structures described above can be manufactured in any suitable way known in the art.

The adsorbent and membranes may comprise laminate sheets that are stacked on one another with intermediate spacer sheets. Additionally or alternatively, the various flow channels may be cut or machined out of a three dimensional solid or substrate. In another aspect, the structure can be constructed via 3D printing technology. The adsorbents and membranes may be applied in such cases by known wash-coating methods described above.

Additionally or alternately, the invention can comprise one or more of the following embodiments.

Embodiment 1

A gas separation module comprising: a first sheet with an inlet zone and an outlet zone, the inlet zone being coated with an adsorbent, the outlet zone being coated with a membrane.

Embodiment 2

The gas separation module of embodiment 1, further comprising: a second sheet, the second sheet configured substantially the same as the first sheet; a spacer sheet between the first sheet and the second sheet; the spacer sheet forming a channel to allow a feed flow from the inlet zone of each sheet to the outlet zone of each sheet.

Embodiment 3

The gas separation module of embodiment 2, further comprising: a third sheet, the third sheet configured substantially the same as the first and second sheets; a transverse spacer sheet between the second sheet and the third sheet; the transverse spacer sheet configured to block the feed flow from the inlet zone of each sheet to the outlet zone of each sheet and forming a channel to allow a cross flow substantially orthogonal to the direction of feed flow.

Embodiment 4

The gas separation module of embodiment 1, further comprising: a second sheet, the second sheet configured substantially the same as the first sheet; a spacer sheet between the first sheet and the second sheet; the spacer sheet forming a channel; wherein the inlet of the spacer sheet is open and the outlet of the spacer sheet is closed; a third sheet, the third sheet configured substantially the same as the first and second sheets; and a transverse spacer sheet between the second sheet and the third sheet; the transverse spacer sheet forming a channel; wherein the inlet of the transverse spacer sheet is closed and the outlet of the transverse spacer sheet is open.

Embodiment 5

The gas separation module of embodiment 3 or 4, wherein only one side of each of the first and second sheets is coated with the adsorbent and the membrane; wherein the coated side is adjacent to the spacer sheet.

Embodiment 6

The gas separation module of any of the previous embodiments, wherein the ratio of a surface area coated by the membrane to a surface area coated by the adsorbent is about 0.5 or less.

Embodiment 7

The gas separation module of any of the previous embodiments, wherein the ratio of a surface area coated by the membrane to a surface area coated by the adsorbent is about 0.3 or less.

Embodiment 8

The gas separation module of any of the previous embodiments, wherein the adsorbent comprises one of an (i) alkali metal carbonate and an oxide of an alkaline earth metal or a transition metal and (ii) alkaline earth metal carbonate and an oxide of a transition metal.

Embodiment 9

The gas separation module of any of the previous embodiments, wherein the membrane comprises a metallic membrane.

Embodiment 10

The gas separation module of any of the previous embodiments, wherein the metallic membrane comprises one of palladium or vanadium.

Embodiment 11

The gas separation module of any of the previous embodiments, wherein the membrane comprises one of an inorganic membrane, a polymer membrane, a carbon membrane, and a composite membrane.

Embodiment 12

The gas separation module of embodiment 1, further comprising a plurality of additional sheets configured substantially the same as the first sheet, wherein alternating between each of the sheets is a spacer sheet forming a channel to allow a feed flow from the inlet zone of each sheet to the outlet zone of each sheet and a transverse spacer sheet configured to block the feed flow from the inlet zone of each sheet to the outlet zone of each sheet and forming a channel to allow a cross flow substantially orthogonal to the direction of feed flow; wherein the first sheet, the plurality of additional sheets, the spacer sheets, and the transverse spacer sheets are radially arranged within a vessel to form an annulus.

Embodiment 13

The gas separation module of any of the previous embodiments, wherein each of the sheets further comprises an intermediate zone disposed between the inlet zone and the outlet zone, wherein the intermediate zone is coated with a reactive adsorbent that is different from the reactive adsorbent in the inlet zone.

Embodiment 14

The gas separation module of embodiment 2, wherein the first sheet, the second sheet, and the spacer sheet are wound about a central axis to form a spiral wound gas separation module; wherein the spacer sheet is closed at the inlet zone and open at the outlet zone and forms a permeate channel; wherein a retentate channel is formed by virtue of the winding; the retentate channel allowing a feed flow from the inlet zone to the outlet zone of the first sheet and second sheets; wherein the permeate channel terminates in a spiral header such that a permeate is permitted to flow from within the permeate channel to the spiral header; and wherein the retentate channel terminates in a separate header from the spiral header such that a retentate is permitted to flow from the termination of the retentate channel to an outlet of the gas separation module.

Embodiment 15

A method of gas separation comprising: providing a feed gas comprising a product and a contaminant; providing a gas separation module comprising a first sheet, a second sheet, a feed gas channel, and at least two cross flow channels; wherein the first sheet and the second sheet are substantially parallel to one another and are coated with an adsorbent in an inlet zone and coated with a membrane in an outlet zone; wherein the adsorbent is preferentially selective for the contaminant as compared to the product; wherein the membrane is selectively permeable to the product and impermeable to the contaminant; wherein the feed gas channel is disposed between the first and second sheets and permits flow of a fluid stream in a direction substantially parallel to the first and second sheets, wherein the cross flow channels are disposed adjacent to the first sheet and the second sheet and permit cross flow of a fluid stream substantially orthogonal to the first and second sheets; wherein the cross flow channels are closed at the inlet zone and the outlet zone; admitting the feed gas to the feed gas channel; adsorbing a portion of the contaminant onto the adsorbent in the inlet zone thereby creating a product-rich stream comprising the product and unadsorbed contaminant; contacting the product-rich stream with the membrane in the outlet zone; permeating the product across the membrane such that the product enters the cross flow channels; desorbing the adsorbed contaminant from the adsorbent in the inlet zone; collecting a non-product effluent stream comprising the contaminant via the feed gas channel; and collecting a product effluent stream comprising the product via the cross flow channels.

Embodiment 16

The method of embodiment 15, wherein the ratio of a surface area coated by the membrane to a surface area coated by the reactive adsorbent is about 0.5 or less.

Embodiment 17

The method of embodiment 16, wherein the ratio of a surface area coated by the membrane to a surface area coated by the reactive adsorbent is about 0.3 or less.

Embodiment 18

The method of any of embodiments 15-17, wherein the feed gas is syngas.

Embodiment 19

The method of any of embodiments 15-17, where the feed gas is flue gas.

Embodiment 20

The method of any of embodiments 15-19, wherein the product comprises hydrogen.

Embodiment 21

The method of any of embodiments 15-20, wherein the product comprises hydrogen and the contaminant comprises carbon dioxide and nitrogen, wherein the adsorbent is selective for carbon dioxide over nitrogen and hydrogen and the membrane is selectively permeable to hydrogen over nitrogen.

Embodiment 22

A gas separation module comprising: a first surface with an inlet zone and an outlet zone, the inlet zone being coated with a reactive adsorbent, the outlet zone being coated with a membrane.

Embodiment 23

The gas separation module of embodiment 22, further comprising: a second surface, the second surface configured substantially the same as the first surface; a first channel between the first surface and the second surface; the first channel allowing a feed flow from the inlet zone of each surface to the outlet zone of each surface.

Embodiment 24

The gas separation module of claim 23, further comprising: a third surface, the third surface configured substantially the same as the first and second surfaces; a second channel between the second surface and the third surface; the second channel configured to block the feed flow from the inlet zone of each surface to the outlet zone of each surface and allowing a cross flow substantially orthogonal to the direction of feed flow.

Embodiment 25

The gas separation module of any of embodiments 22-24, wherein the surfaces are created by machining three-dimensional substrates or three-dimensional solids.

Embodiment 26

The gas separation module of any of embodiments 22-24, wherein the surfaces are created by 3D printing.

The invention claimed is:

1. A gas separation module comprising:
a first sheet with an inlet zone and an outlet zone, the inlet zone being coated with an adsorbent, the outlet zone being coated with a membrane;
wherein the adsorbent comprises one of an (i) alkali metal carbonate and an oxide of an alkaline earth metal or a transition metal and (ii) alkaline earth metal carbonate and an oxide of a transition metal.

2. The gas separation module of claim 1, wherein the ratio of a surface area coated by the membrane to a surface area coated by the adsorbent is about 0.5 or less.

3. The gas separation module of claim 2, wherein the ratio of a surface area coated by the membrane to a surface area coated by the adsorbent is about 0.3 or less.

4. The gas separation module of claim 1, wherein the membrane comprises a metallic membrane.

5. The gas separation module of claim 4, wherein the metallic membrane comprises one of palladium or vanadium.

6. The gas separation module of claim 1, wherein the membrane comprises one of an inorganic membrane, a polymer membrane, a carbon membrane, and a composite membrane.

7. The gas separation module of claim 1, wherein each of the sheets further comprises an intermediate zone disposed between the inlet zone and the outlet zone, wherein the intermediate zone is coated with a reactive adsorbent that is different from the reactive adsorbent in the inlet zone.

8. A gas separation module comprising:
   a first surface with an inlet zone and an outlet zone, the inlet zone being coated with a reactive adsorbent, the outlet zone being coated with a membrane;
   wherein the adsorbent comprises one of an (i) alkali metal carbonate and an oxide of an alkaline earth metal or a transition metal and (ii) alkaline earth metal carbonate and an oxide of a transition metal.

9. The gas separation module of claim 8, further comprising:
   a second surface, the second surface configured substantially the same as the first surface;
   a first channel between the first surface and the second surface; the first channel allowing a feed flow from the inlet zone of each surface to the outlet zone of each surface.

* * * * *